United States Patent [19]

Shikatani et al.

[11] Patent Number: 4,952,667
[45] Date of Patent: Aug. 28, 1990

[54] NOVEL COPOLYMERS AND ELECTROACTIVE POLYMERS DERIVED FROM SAME

[75] Inventors: Yutaka Shikatani, Kawasaki; Hobuyuki Kuroda, Yokohama; Naoki Kataoka, Kawasaki; Yoshiyuki Shimo, Yokohama; Kazuo Matsuura, Tokyo; Etsuo Kawamata, Kawasaki; Hiroshi Kobayashi, Yokohama, all of Japan

[73] Assignee: Nippon Oil Company, Limited, Japan

[21] Appl. No.: 204,083

[22] Filed: Jun. 8, 1988

[30] Foreign Application Priority Data

Jun. 22, 1987 [JP] Japan ................................ 62-153429
Jun. 22, 1987 [JP] Japan ................................ 62-153427
Oct. 6, 1987 [JP] Japan ................................ 62-143267

[51] Int. Cl.$^5$ ............................................. C08G 10/02
[52] U.S. Cl. ................................... 528/230; 528/247; 528/248; 528/249; 528/266; 528/269; 252/500; 252/511
[58] Field of Search ............... 528/230, 247, 248, 249, 528/266, 269; 252/500, 511

[56] References Cited

U.S. PATENT DOCUMENTS 4,025,341 5/1977 Rule .................................... 96/1.6
4,548,738 10/1985 Jenekhe et al. ...................... 252/500

Primary Examiner—John Kight, III
Assistant Examiner—Sam A. Acquah
Attorney, Agent, or Firm—Scully, Scott, Murphy & Presser

[57] ABSTRACT

Provided is a copolymer having a repeating unit represented by the general formula

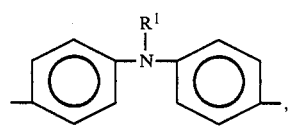

wherein Ar represents

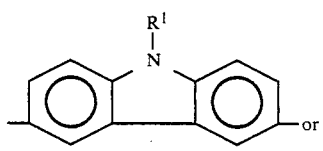

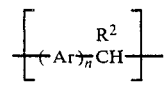

or

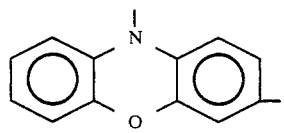

wherein $R^1$ represents hydrogen or a hydrocarbon group having 1 to 20 carbon atoms, $R^2$ represents hydrogen, a hydrocarbon group having 1 to 20 carbon atoms, furyl, pyridyl, chlorophenyl, nitrophenyl or methoxyphenyl, n is 1 or more and an electroactive polymer obtained by doping the above copolymer.

3 Claims, 10 Drawing Sheets

NOVEL COPOLYMERS AND ELECTROACTIVE POLYMERS DERIVED FROM SAME

BACKGROUND OF THE INVENTION

The present invention relates to a novel polymer, particularly a novel electroconductive polymer and a precursor thereof.

As polymers used for forming electroconductive polymers there are known polyacetylenes, polyparaphenylenes, polythiophenes and polypyrroles. These polymers become employable as electroconductive polymers by being doped using certain kinds of compounds. However, the electroconductive polymers thus obtained are apt to change in quality, especially electrical characteristics, in the air. Further, those polymers are poor in meltability and solubility so are extremely inferior in processability. These drawbacks cause a large obstacle to their practical use. For example, as an application of such electroconductive polymers there has been proposed an application to electrodes for a secondary battery utilizing their reversible redox characteristic. In most cases, however, they are unstable physically or chemically in the electrolyte of a secondary battery. Therefore, it is impossible to expect a stable cyclability of charge and discharge which is a base performance required for a secondary battery. Besides, electroconductive polymers are insoluble and unmeltable because their skeleton is constituted by a π electron conjugated system, and this point is also a serious obstacle to their practical use. As a solution to these-problems there has been proposed in U.S. Pat. No. 4,505,844 an electroactive polymer obtained by doping a polymer having a 3,10-phenoxazinediyl structure as a repeating unit, using an electron acceptor. However, such a phenoxazine polymer is an oligomer of a low polymerization degree, lacking in mechanical strength and moldability which the polymer should possess as a high polymer. For example, in the case of using this polymer as an electrode material of a secondary battery, a soluble component will dissolve out with repetition of charge and discharge, so it is impossible to expect a stable cyclability.

Moreover, in order to impart mechanical strength and moldability to such phenoxazine polymer in addition to good electrochemical characteristics, it is necessary to obtain a polymer higher in the degree of polymerization (a high polymer). But it is difficult to obtain a high polymer even according to any of processes commonly used for the preparation of polyaromatic compounds or polyheteroaromatic compounds, such as Grignard coupling, oxidative coupling, Friedel-Crafts reaction and electrolytic oxidation polymerization. Even under severer reaction conditions, not only it is impossible to expect the realization of a higher molecular weight due to an induced hetero-linkage or crosslinking reaction, but also the polymer becomes incapable of dissolving and melting with loss in processability which is one of the advantages of high polymers. Further, the polymer becomes inactive electrically.

Also, it has been reported that a polymer having a 3,6-N-methylcarbazolyl methylene structure as a repeating unit is soluble in an organic solvent and it exhibits a direct current electroconductivity of about $10^{-3}$ S/cm when doped with an electron acceptor [Synthetic Metals, 10, pp.281-292 (1985)].

However, the above carbazolyl methylene polymer has the drawback that it does not have a reversible doping characteristic or a reversible redox characteristic because the doping causes elimination of hydrogen of methylene in the main polymer chain. Therefore, improvement on this point has been desired.

SUMMARY OF THE INVENTION

It is the object of the present invention to provide an electroconductive polymer and a precursor thereof both free of the above-mentioned drawbacks of the prior art.

According to the present invention there are obtained a copolymer represented by the general formula:

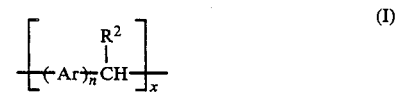

wherein Ar represents

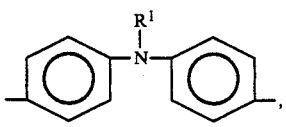

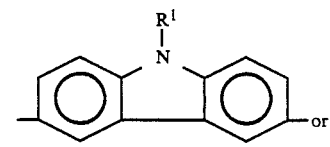

or

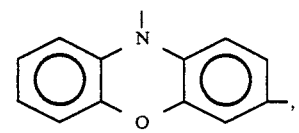

$R^1$ represents hydrogen or a hydrocarbon group having 1 to 20 carbon atoms, $R^2$ represents hydrogen, a hydrocarbon group having 1 to 20 carbon atoms, furyl, pyridyl, chlorophenyl, nitrophenyl or methoxyphenyl, n is an integer not smaller than 1 and x is an integer not smaller than 2, as well as an electroactive polymer obtained by doping the said copolymer with an electron acceptor.

PREFERRED EMBODIMENTS OF THE INVENTION

The copolymer represented by the general formula (I) of the present invention can be prepared by polycondensing a copolymer (incl. an oligomer) represented by the general formula H - $(Ar)_n$ - H (II) wherein Ar and n are as defined above, with an aldehyde, or a polymer thereof, represented by the general formula $R^2CHO$ (III) wherein $R^2$ is as defined above.

As examples of the polymer represented by the general formula (II) there are mentioned polymers having as a repeating unit a 4,4'-diphenylamine structure represented by the general formula (II-1)

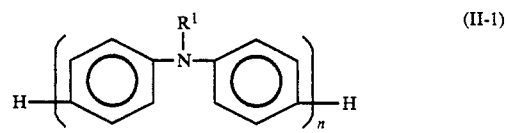

polymers having as a repeating unit a 3,6-carbazolediyl structure represented by the general formula (II-2)

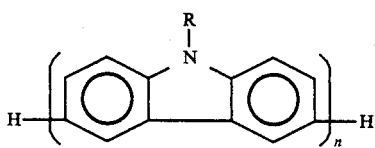
(II-2)

and polymers having as a repeating unit a phenoxadine or 3,10-phenoxazinediyl structure represented by the general formula (II-3)

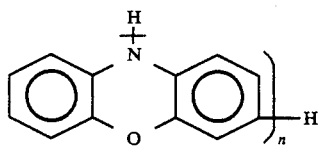
(II-3)

The polymers having as a repeating unit a 4,4'-diphenylamine structure represented by the general formula (II-1) can be prepared by a known process such as, for example, an oxidative coupling process or a Grignard coupling process as in Japanese Patent Laid Open No. 206170/1986 or No. 28524/1986. In the general formula (II-1), $R^1$ represents hydrogen or a hydrocarbon group having 1 to 20, preferably 1 to 8, carbon atoms As examples of such hydrocarbon group are mentioned methyl, ethyl, n-propyl, i-propyl, n-butyl, i-butyl, n-hexyl, allyl, various aryl groups such as phenyl, tolyl and ethylphenyl, aralkyl, and derivatives thereof. In the same formula, n is not smaller than 2, but usually in the range of 2 to 50, preferably 2 to 30.

The polymers having as a repeating unit a 3,6-carbazolediyl structure represented by the general formula (II-2) can be prepared by a known process such as, for example, a process for preparing a carbazole dimer using an oxidant-solvent system as reported in Yuki Gosei Kagaku Kaishi, Vol.23, No.5, p.447 (1965); a process for preparing a carbazole dimer using a dehydrogenation catalyst as reported in P. Beresford et al., J Chem. Soc. Perkin. I, p.276 (1974; an oxidative coupling process or a Grignard coupling process as in Japanese Patent Laid Open No. 141725/1986 or No. 88422/1981. In the general formula (II-2), $R^1$ represents hydrogen or a hydrocarbon group having 1 to 20, preferably 1 to 8, carbon atoms. As examples of such hydrocarbon group are mentioned methyl, ethyl, n-propyl, n-butyl, i-butyl, n-hexyl, allyl, aryl group's such as phenyl, tolyl and ethylphenyl, aralkyl, and derivatives thereof. In the same formula, n is not smaller that 2, but usually in the range of 2 to 50, preferablely 2 to 30.

The polymers having as a repeating unit a 3,10-phenoxazinediyl structure represented by the general formula (II-3) can be prepared, for example, by using an oxidant such as a permanganate or a dichromate in acetone, pyridine, benzine, water, or a mixed solvent thereof. Together with the oxidant there may be used a phase transfer catalyst such as tetraalkyl ammonium hydrogen sulfate or crown ether. In the same general formula, n is not smaller than 1, but usually in the range of 1 to 50, preferably 2 to 30.

As the aldehyde represented by the general formula (III) there is used a compound of the same formula wherein $R^2$ is hydrogen or a hydrocarbon group having 1 to 20, preferably 1 to 8, carbon atoms, or furyl, pyridyl, chlorophenyl, nitrophenyl or methoxyphenyl. As examples of such a hydrocarbon group are mentioned methyl, ethyl, n-propyl, i-propyl, n-butyl, i-butyl, n-hexyl, ally, various aryl groups such as phenyl, tolyl and ethylphenyl, aralkyl, and derivatives thereof. Typical examples of such aldehyde are formaldehyde, acetaldehyde, propionaldehyde, butylaldehyde, benzaldehyde, acrylaldehyde, cinnamaldehyde, anisaldehyde, chlorobenzaldehyde, nitrobenzaldehyde, nicotinaldehyde, and furfural.

"A polymer of the aldehyde" represents a polymer obtained by self-condensation of a concentrated solution of an aldehyde of the general formula (III) or by condensation of the aldehyde in the presence of an acid catalyst. The said polymer should hydrolyze easily under the reaction conditions for the preparation of the copolymer of the present invention to produce an aldehyde monomer. Typical examples are paraformaldehyde which is a polymer of formaldehyde and paraaldehyde which is a trimer of acetaldehyde.

The polycondensation of a polymer of the general formula (II) and an aldehyde of the general formula (III) or a polymer thereof can be conducted using an acid or alkali catalyst in an organic solvent in which both are soluble, at a temperature in the range of 0° to 200° C. Examples of acid catalysts are inorganic acids such as sulfuric, hydrochloric, perchloric and phosphoric acids, as well as organic acids such as formic, acetic, methanesulfonic, p-toluenesulfonic and propionic acids. Preferred red examples of organic solvents include ethers such as ethyl ether, tetrahydrofuran and dioxane, halogenated hydrocarbons such as chloroform, dichloromethane and chlorobenzene, nitro compounds such as nitrobenzene, acetonitrile, propylene carbonate, dimethylformamide, and N-methylpyrrolidone. The reaction time can be selected suitably in the range of 1 minute to 500 hours, preferably 5 minutes to 200 hours.

By the above reaction there is obtained the copolymer (I) of the present invention which is substantially linear and high in the degree of polymerization. In the copolymer of the general formula (I), x is not smaller than 2, usually in the range of 2 to 1,000, preferably 5 to 200, and the copolymer substantially has a linear structure. The copolymer of the present invention is soluble in chloroform, N-methylpyrrolidone, nitrobenzene and sulfuric acid, but insoluble in alcohols, aliphatic hydrocarbons, propylene carbonate and acetonitrile used in an organic electrolyte type battery. It is a thermoplastic resin capable of being melted on heating, superior in processability and capable of being formed into products of various desired shapes.

The copolymer of the present invention exhibits a high electroactivity by being doped with an electron acceptor as a dopant and permits a redox reaction to be performed in good repeatability. For example, therefore, when it is used as an electrode material in a secondary battery, it is possible to effect reversible charge and discharge. Even when the number of repetitions (the number of cycles) of charge and discharge is increased, there can be obtained extremely stable characteristics without occurrence of such a dissolving-out phenomenon as is induced in the use of a phenoxazine polymer and the resulting deterioration of cyclability.

As examples of electron accepting dopants are mentioned iodine, bromine, halides such as hydrogen iodide, metal halides such as arsenic pentafluoride, phosphorus pentachloride, phosphorus pentafluoride, antimony pentafluoride, silicon tetrafluoride, aluminum chloride, aluminum fluoride and ferric chloride, protic acids such as sulfuric, nitric and chlorosulfonic acids, oxidants such as sulfur trioxide and difluorosulfonyl peroxide, and organic materials such as tetracyanoquinodimethane. As examples of dopants which permit electrochemical doping there are mentioned anions such as halide anions of Va Group elements, e.g., $PF_6^-$, $SbF_6^-$, and $AsF_6^-$, halide anions of III-A Group elements, e.g., $BF_4^-$, halogen anions, e.g., $I^-$ ($I_8^-$), $Br^-$ and $C(^-$, and perchloric acid anions, e.g., $C(O_4^-$.

Further, the copolymer of the present invention has the property that when it is doped with anion, the nitrogen atom in the polymer bears a positive charge and affords a stable state. Therefore, it is stable to the repetition of oxidation and reduction and is superior in processability. These characteristics are utilized to constitute various functional electrodes of batteries, etc. More specifically, in constituting such electrodes, the copolymer of the present invention can be formed into a desired shape by dissolving it in a solvent followed by molding, or by molding it in a heat-melted state, or by pressure molding using the copolymer as a main component, or by forming using a binder. As the binder there may be used, for example, polyfluoroethylene, polyvinylidene fluoride, polyvinyl chloride, or polyethylene, provided there do not always constitute a limitation.

Since the copolymer of the present invention is linear, it is superior in processability, making it possible to obtain various shaped articles easily. Moreover, high electroconductivity can be developed by doping the copolymer with an electron acceptor. Besides, the doping is reversible and an extremely high cyclability can be attained. The copolymer is superior as an electroconductive polymer.

The following examples are given to illustrate the present invention more concretely, but it is to be understood that the invention is not limited thereto.

EXAMPLE 1

(Preparation of N-methyldiphenylamine polymer)

50.0 g of anhydrous $FeC(_3$ was placed in a three-necked, 300-ml flask and dissolved by the addition of 150 ml ethanol, then 18.4 g of N-methyldiphenylamine was added and reaction was allowed to take place with stirring in a nitrogen atmosphere at room temperature for 24 hours. After the reaction, the resulting precipitate of bluish green was filtered, then washed with ethanol and ion-exchanged water, thereafter again washed with ethanol and then dried to yield 12.1 g of a blue solid.

The solid thus obtained was dissolved in 200 ml of dichloromethane and then filtered. The filtrate was recovered and the dichloromethane was removed, followed by drying to afford 11.6 g of an N-methyldiphenylamine polymer soluble in dichloromethane.

As a result of mass spectrometric analysis of the N-methyldiphenylamine polymer, main peaks were detected at mass numbers of 364 and 545, and the polymer was found to be an oligomer of N-methyldiphenylamine with polymerization degrees of 2 and 3. Further, as a result of infrared spectroscopic analysis there was recognized absorption at 820 $cm^{-1}$ derived from para-substituted benzene. From this result, the polymer was found to have a structure connected in the para-position of the phenyl group in the N-methyldiphenylamine.

(Polycondensation of the N-methyldiphenylamine polymer and propionaldehyde)

2.0 g of the N-methyldiphenylamine polymer prepared above was placed in a three-necked, 300-ml flask and dissolved in 40 ml of 1,4-dioxane. Then, 0.5 ml of concentrated sulfuric acid and 0.38 g of propionaldehyde dissolved in 20 ml of 1,4-dioxane were added dropwise and reaction was allowed to take place with stirring under heating at 85° C. for 3 hours. Thereafter, the reaction solution was poured into 200 ml of ethanol and the resulting precipitate was filtered, washed with acetonitrile and then dried to yield 0.73 g of a blue polymer. The polymer was soluble in chloroform, N-methylpyrrolidone and nitrobenzene and insoluble in acetonitrile, propylene carbonate and aliphatic hydrocarbons.

As a result of infrared spectroscopic analysis, as shown in FIG. 1, there appeared a strong absorption at 820 $cm^{-1}$ derived from para-substituted benzene. At the same time, absorptions at 700 $cm^{-1}$ and 750 $cm^{-1}$ derived from monosubstituted benzene recognized in the infrared absorption spectrum of the N-methyldiphenylamine polymer were decreased to a remarkable extent, proving that the polycondensation with aldehyde occurred in the para position of the end phenyl group of the N-methyldiphenylamine polymer.

REFERENCE EXAMPLE 1

The polymer obtained in Example 1 was pressure-bonded onto a platinum net to make a measuring electrode. Then, the electrode was subjected to a cyclic voltametric analysis in a dry nitrogen atmosphere using a 0.7 mol/1 solution of (n-$C_4H_9)_4NC1O_4$ in acetonitrile as electrolyte, a platinum plate as a counter electrode and an $Ag/AgNO_3$ electrode as a reference electrode. A sweep speed of 50 mV/sec was used. The results are as shown in FIG. 2. There was no change even in several tens of redox cycles. A reversible and extremely stable redox behavior was exhibited. Redox potential was 0.40V VS. $Ag/AgNO_3$.

EXAMPLE 2

Reaction was conducted in the same way as in Example 1 except that N-ethyldiphenylamine and a 37% aqueous formaldehyde solution were used in place of N-methyldiphenylamine and propionaldehyde, respectively. N-ethyldiphenylamine was used in an amount of 20.0 g to obtain 12.6 g of an N-ethyldiphenylamine polymer. Further, 2.0 g of this polymer and 0.85 g of a 37% aqueous formaldehyde solution were reacted for polycondensation at room temperature for 4 hours to obtain 16.3 g of a polycondensate of the N-ethyldiphenylamine polymer and formaldehyde. The degree of polymerization, x, is about 70.

REFERENCE EXAMPLE 2

Cyclic voltametric analysis was made in the same way as in Reference Example 1 except that the polymer obtained in Example 2 was used in place of the polycondensate of the N-methyldiphenylamine polymer and propionaldehyde. The results are as shown in FIG. 3. A reversible and extremely stable redox behavior was exhibited. Redox potential was 0.41V VS. $Ag/AgNO_3$.

EXAMPLE 3

Reaction was conducted in the same way as in Example 1 except that 0.66 g of benzaldehyde was used in place of propionaldehyde. After purification, there was obtained 0.41 g of a polycondensate.

REFERENCE EXAMPLE 3

Cyclic voltametric analysis was made in the same way as in Reference Example 1 except that the polymer obtained in Example 3 was used in place of the polycondensate of the N-methyldiphenylamine polymer and propionaldehyde. The results are as shown in FIG. 4. A reversible and extremely stable redox behavior was exhibited. Redox potential was 0.40V. VS. Ag/AgNO$_3$.

EXAMPLE 4

Reaction was conducted in the same way as in Example 1 except that 0.41 g of para-aldehyde was used in place of propionaldehyde. After purification, there was obtained 0.87 g of a polycondensate.

EXAMPLE 5

Reaction was conducted in the same way as in Example 1 except that 0.30 g of acetaldehyde was used in place of propionaldehyde. After purification, there was obtained 0.81 g of a polycondensate.

EXAMPLE 6

(Preparation of N-ethylcarbazole dimer)

8.0 g of N-ethylcarbazole, 30 ml of a 70% aqueous perchloric acid solution and 30 ml of glacial acetic acid were charged into a three-necked, 200-ml flask to obtain a homogeneous solution. Then, 9.0 g of 2,3-dichloro-5,6-dicyano-p-benzoquinone dissolved in 200 ml of glacial acetic acid was added dropwise with stirring at room temperature over a period of 1 hour. Thereafter, the resulting precipitate was filtered and washed with diethyl ether. The resulting black powder was dissolved in 600 ml of acetone and a saturated aqueous sodium hydrosulfide solution was added dropwise to effect reduction. Thereafter, the resulting precipitate was filtered and dried, leaving 7.3 g of a crude N-ethylcarbazole dimer of yellow color. The dimer was dissolved in chloroform and passed through an alumina column to obtain 6.8 g of a purified N-ethylcarbazole dimer of light yellowish white.

As a result of infrared spectroscopic analysis and $^1$H-NMR analysis, the N-ethylcarbazole dimer prepared above was found to be 9,9'-diethyl-3,3'-bicarbazolyl having a structure connected in the 3-position of N-ethylcarbazole (Polycondensation of the N-ethylcarbazole dimer and formaldehyde)

0.39 of the N-ethylcarbazole dimer prepared above was charged into a three-necked, 50-ml flask and dissolved in 15 ml of 1,4-dioxane. Then, several drops of concentrated sulfuric acid were added and 82 mg of a 37% aqueous formaldehyde solution was added dropwise, then stirring was made under heating at 85° C for 3 hours, allowing reaction to take place. After the reaction, the resulting precipitate was filtered, washed with methanol and then dried to give 0.36 g of a bluish green polymer The polymer was soluble in N-methylpirrolidone and nitrobenzene and insoluble in acetonitrile propylene carbonate and aliphatic hydrocarbons.

The results of infrared spectroscopic analysis are as shown in FIG. 5. There appeared strong absorptions at 790 cm$^{-1}$ and 870 cm$^{-1}$ derived from 1,2,4-trisubstituted benzene. At the same time, 1,2-disubstituted benzene-derived absorption at 750 cm$^{-1}$ recognized in the infrared absorption spectrum of the N-ethylcarbazole monomer and dimer was decreased relatively, proving the occurrence of polycondensation with aldehyde in the 6,6'-positions of the N-ethylcarbazole dimer.

REFERENCE EXAMPLE 4

The copolymer obtained in Example 6 was pressure-bonded onto a platinum net to make a measuring electrode. The electrode was subjected to a cyclic voltametric analysis in a dry nitrogen atmosphere using a 0.7 mol/1 solution of n-C$_4$H$_9$NC1O$_4$ in acetonitrile as a electrolyte, a platinum plate as a counter electrode and an Ag/AgNO$_3$ electrode as a reference electrode. A sweep speed of 50 mV/sec was used. The results are as shown in FIG. 6. There was no change even in several tens of redox cycles. A reversible and extremely stable redox behavior was exhibited. Redox potential was 0.74V VS. Ag/AgNO$_3$.

EXAMPLE 7

(Preparation of N-ethylcarbazole polymer)

19.5 g of N-ethylcarbazole, 450 ml of glacial acetic acid and 20 ml of concentrated sulfuric acid were charged into a three-necked, 1000-ml flask to give a homogeneous solution. Then, 35.4 g of sodium dichromate dissolved in 30 ml of ion-exchanged water was added dropwise with stirring at 15° C. over a period of 30 minutes. After stirring for additional 20 minutes at 15° C., 750 ml of a saturated aqueous sodium hydrogensulfide was added and stirring was made at 65° C. for 1 hour and the reaction stopped. Thereafter, the reaction solution was filtered and the resulting solid was dried, then dissolved in chloroform and passed through a silica column to afford 6.3 g of an N-ethylcarbazole polymer of yellowish green.

The N-ethylcarbazole polymer thus prepared was subjected to a mass spectroscopic analysis to find that it was a dimer-trimer mixture of N-ethylcarbazole. Further, as a result of infrared spectroscopic analysis and $^1$H-NMR analysis, the polymer proved to be a dimer-trimer mixture of N-ethylcarbazole having a structure connected in the s-position of the N-ethylcarbazole (Polycondensation of the N-ethylcarbazole polymer and formaldehyde)

Reaction was conducted in the same manner as in Example 6 except that 0.30 g of the N-ethylcarbazole polymer prepared above was used in place of the N-ethylcarbazole dimer. After purification, there was obtained 0.29 g of a polycondensate

REFERENCE EXAMPLE 5

Cyclic voltametric analysis was made in the same manner as in REference Example 4 except that the copolymer obtained in Example 2 was used in place of the polycondensate of the N-ethylcarbazole dimer and formaldehyde. The results are as shown in FIG. 7. A reversible and extremely stable redox behavior was exhibited. Redox potential was 0.70V VS. Ag/AgNO$_3$.

COMPARATIVE EXAMPLE

Reaction was conducted in the same manner as in the polycondensation reaction of the N-ethylcarbazole dimer and formaldehyde in Example 6 except that 0.35 g of N-ethylcarbazole and 160 mg of a 37% aqueous formaldehyde solution were used in place of the N- ethylcarbazole dimer After purification, there was obtained 0.32 g of a polycondensate. The polycondensate was extracted with chloroform to find that 0.19 g (60%) was soluble in chloroform and 0.13 g (40%) insoluble.

Cyclic voltametric analysis was made in the same manner as in Reference Example 4 except that the above two kinds of chloroform-soluble and -insoluble polycondensates were used in place of the polycondensate of the N-ethylcarbazole dimer and formaldehyde. The results are as shown in FIG. 8 (chloroform-soluble portion) and FIG. 9 (chloroform-insoluble portion). Neither exhibited a reversible redox behavior

EXAMPLE 8

(Preparation of phenoxazine oligomer)

150 ml of acetone and 5.1 g of phenoxazine were charged into a three-necked, 300-ml flask equipped with a stirrer, a dropping funnel and a reflux condenser, then stirring was made to dissolve phenoxazine, followed by ice cooling. Then, a saturated potassium permanganate solution in acetone was added dropwise After its addition in an amount of 10.5 g as potassium permanganate, the reaction was terminated. The resulting precipitate was filtered, washed with acetone, air-dried and thereafter placed in hot toluene, followed by stirring. Insoluble manganese dioxide was separated by filtration. The toluene was removed the filtrate under reduced pressure to obtain a crude phenoxazine oligomer powder of gray color This powder was purified by being dissolved again in toluene and reprecipitated using methanol, to give 3.3 g of a purified phenoxazine oligomer. Yield was 65%.

(Polycondensation of the phenoxazine oligomer and formaldehyde)

0.30 g of the phenoxazine oligomer prepared above was charged into a three-necked, 50-ml flask and dissolved in 5 ml of 1,4-dioxane. Then, several drops of concentrated sulfuric acid were added 40 mg of a 37% aqueous formaldehyde solution was added dropwise, followed by stirring under heating at 80° C. for 1 hour to allow reaction to take place. After the reaction, the resulting precipitate was filtered, washed with methanol and then dried to afford 0.31 g of a green polymer. The polymer was soluble in N-methylpyrrolidone and nitrobenzene and insoluble in acetonitrile, propylene carbonate and aliphatic hydrocarbons.

The results of infrared spectroscopic analysis are shown in FIG. 10. There were recognized absorptions derived from 1,2,4-trisubstituted benzene at 800 cm$^{-1}$ and 870 cm$^{-1}$ and an absorption derived from 1,2-disubstituted benzene at 750 cm$^{-1}$. Other absorption positions coincide with those in an infrared absorption spectrum of the phenoxazine oligomer, proving the occurrence of polycondensation with aldehyde in the terminal 3-position of the phenoxazine oligomer

REFERENCE EXAMPLE 6

The copolymer obtained in Example 8 was pressure-bonded onto a platinum net to make a measuring electrode. The electrode was subjected to a cyclic voltametric analysis in a dry nitrogen atmosphere using a 0.7 mol/l solution of n-C$_4$H$_9$NClO$_4$ in acetonitrile as electrolyte, a platinum plate as a counter electrode and an Ag/AgNO$_3$ electrode as a reference electrode. A sweep speed of 50 mV/sec was used. The results are as shown in FIG. 11. There was no change even in several tens of redox cycles. A reversible and extremely stable redox behavior was exhibited. Redox potential was 0.46V VS. Ag/AgNO$_3$.

EXAMPLE 9

Reaction was conducted in the same manner as in Example 8 except that phenoxazine was used in place of the phenoxazine oligomer. Using 0.70 g of phenoxazine, 0.70 g of a 37% aqueous formaldehyde solution and 15 ml of 1,4-dioxane, reaction was performed at room temperature for 30 minutes. After purification, there was obtained 0.75 g of a polycondensate.

REFERENCE EXAMPLE 7

Cyclic voltametric analysis was made in the same manner as in Reference Example 6 except that the copolymer prepared in Example 9 was used in place of the polycondensate of the phenoxazine oligomer and formaldehyde. The results are as shown in FIG. 11. A reversible and extremely stable redox behavior was exhibited. Redox potential was 0.36V VS. AG/AgNO$_3$.

Figure 1:
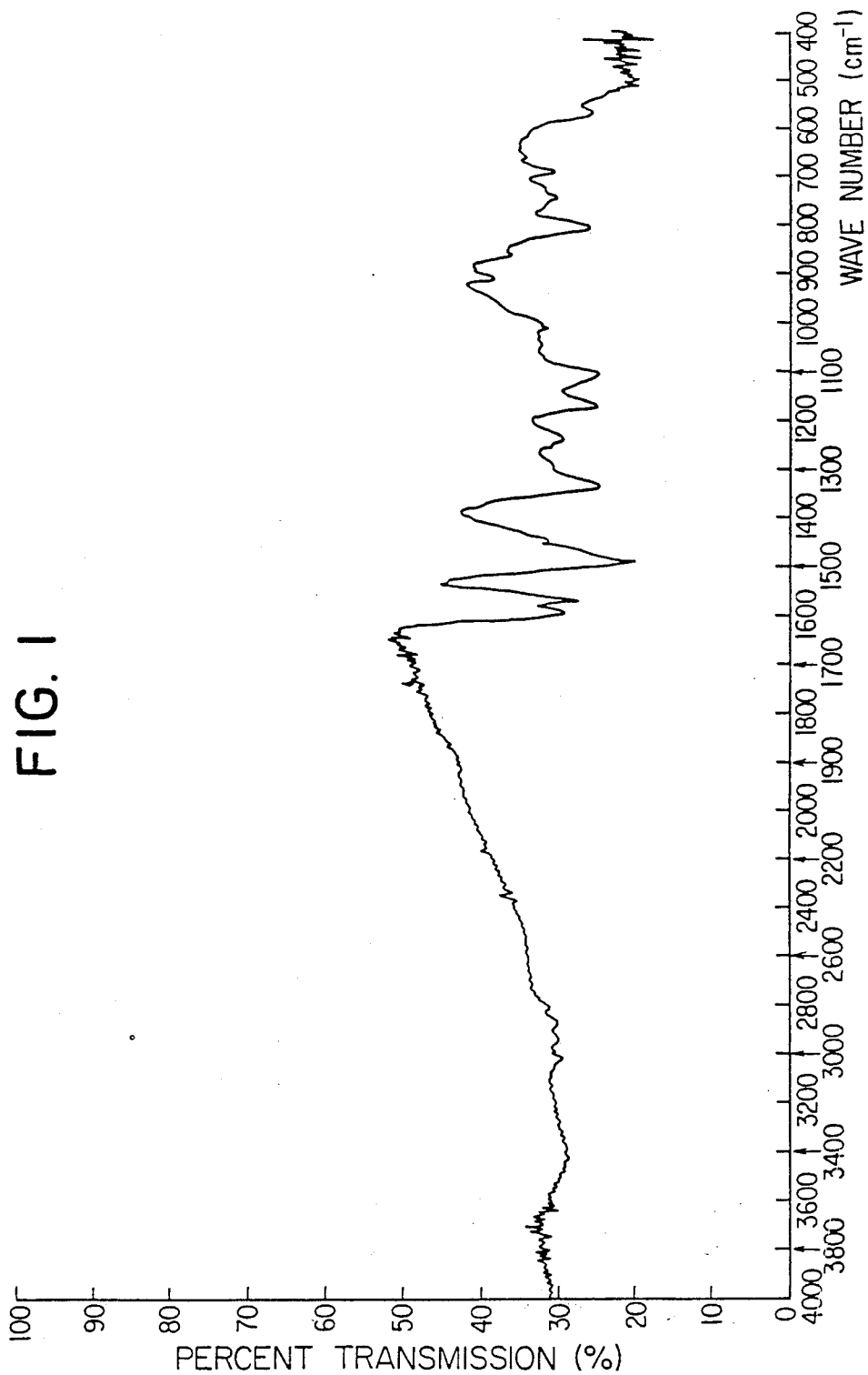
FIGS. 1, 5 and 10 show, respectively, an infrared absorption spectrum of the copolymer obtained in Examples 1, 6 and 8.
Figure 2:
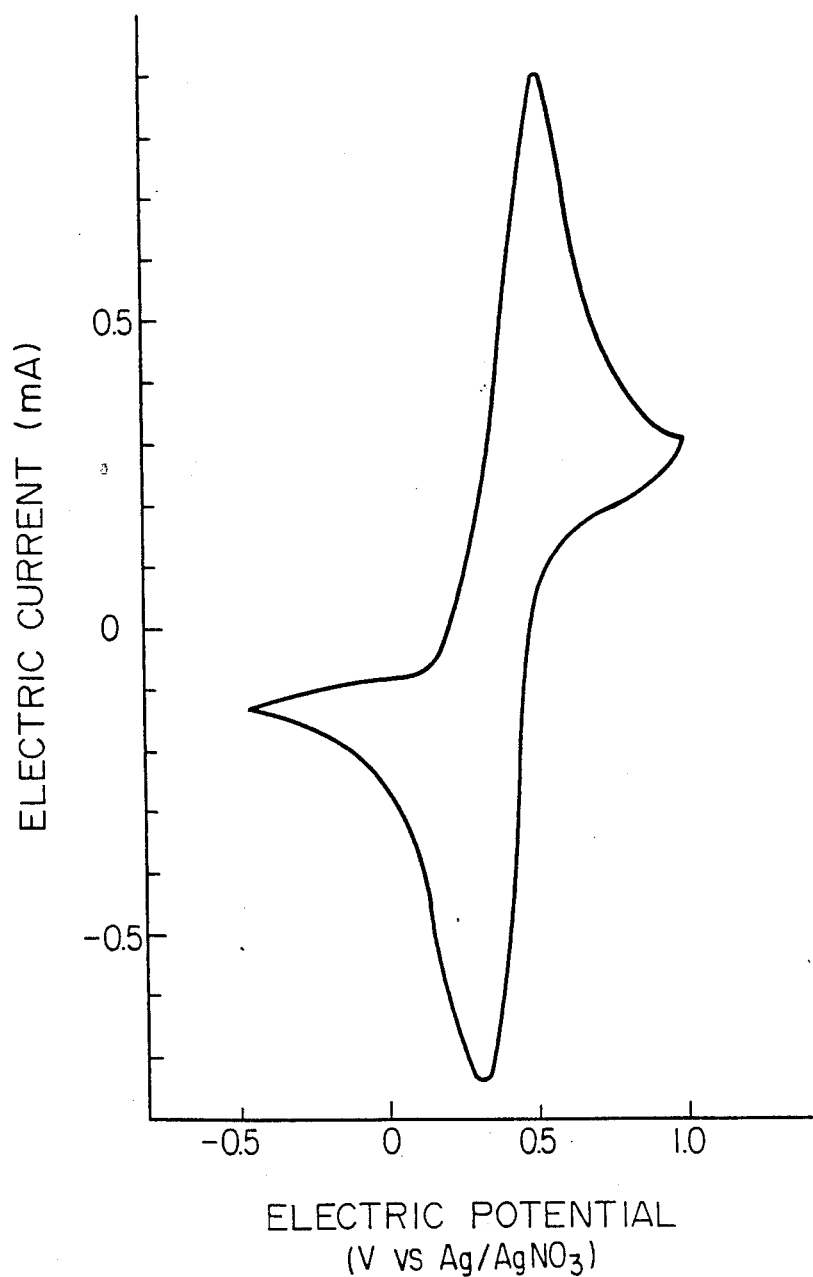
FIGS. 2-4, 6-9, 11 and 12 show, respectively, the results of a cyclic voltametric analysis of the electrode obtained in Reference Examples 1-5, comparative Example (FIGS. 8 and 9) and Reference Examples 6 and 7.
Figure 3:
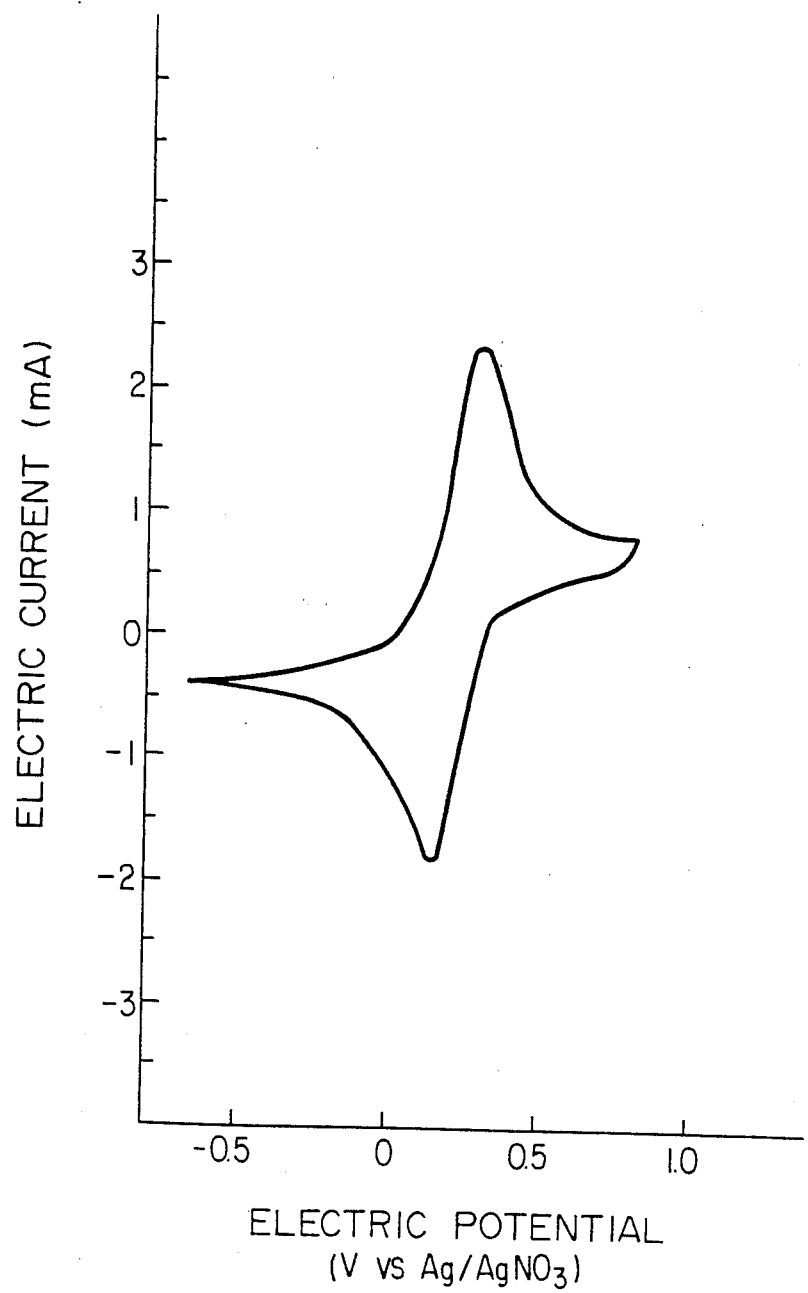
Figure 4:
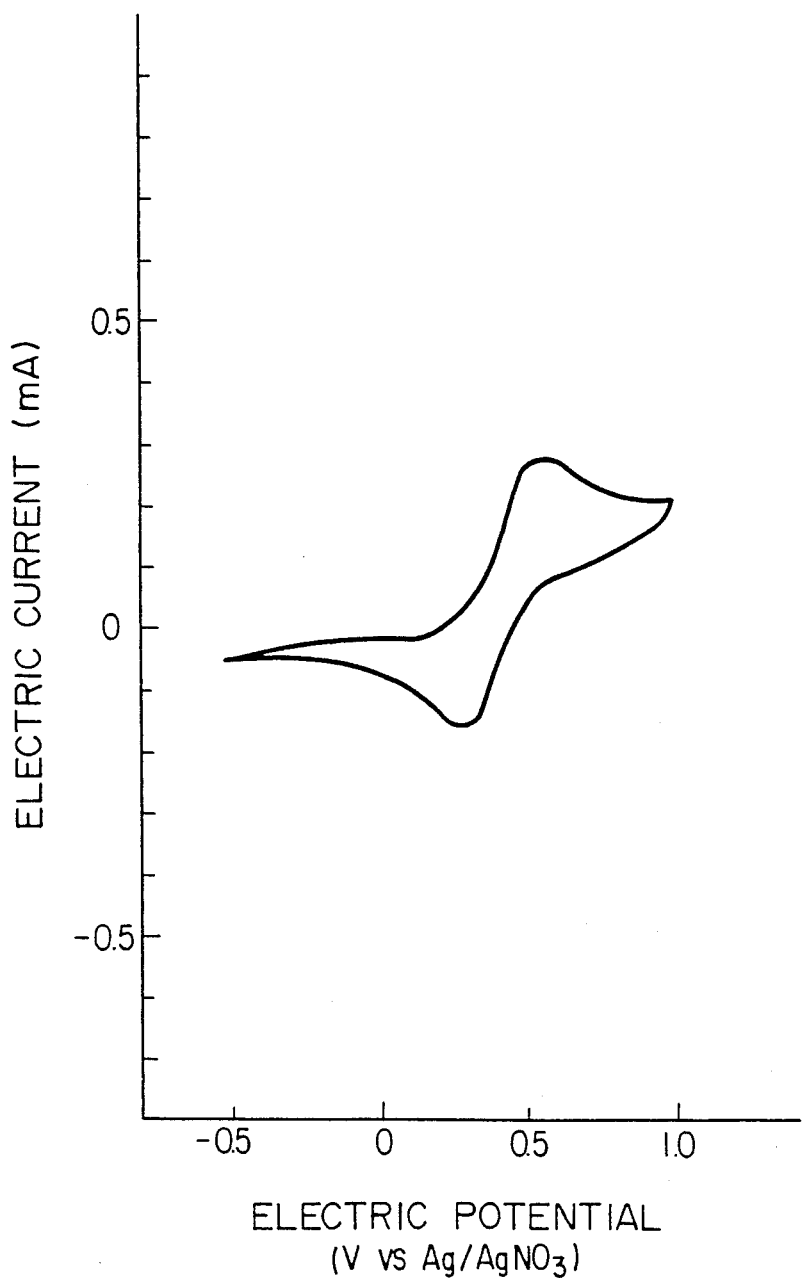
Figure 5:
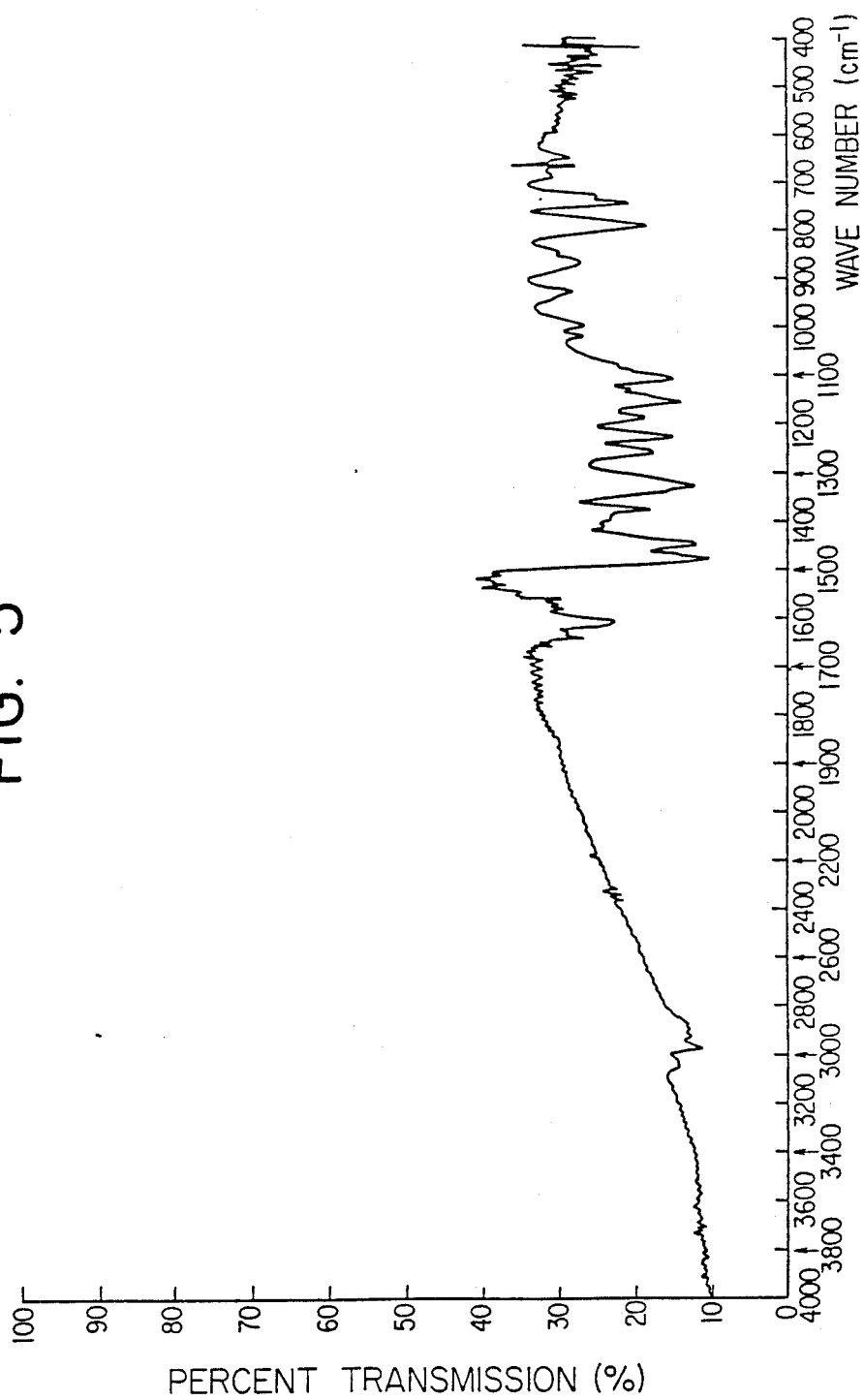
Figure 6:
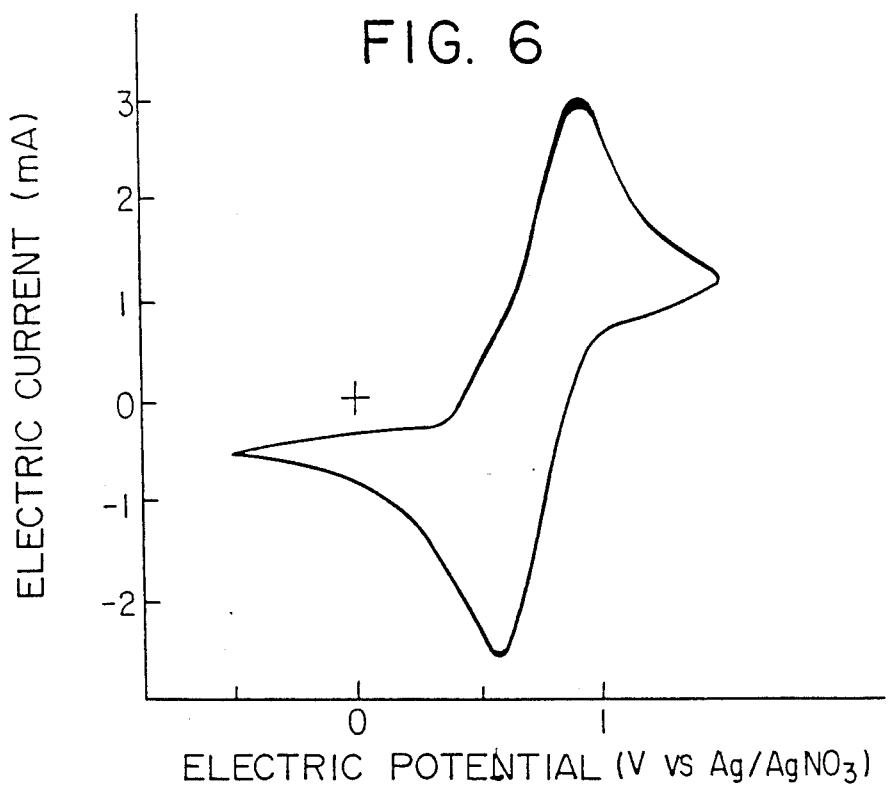
Figure 7:
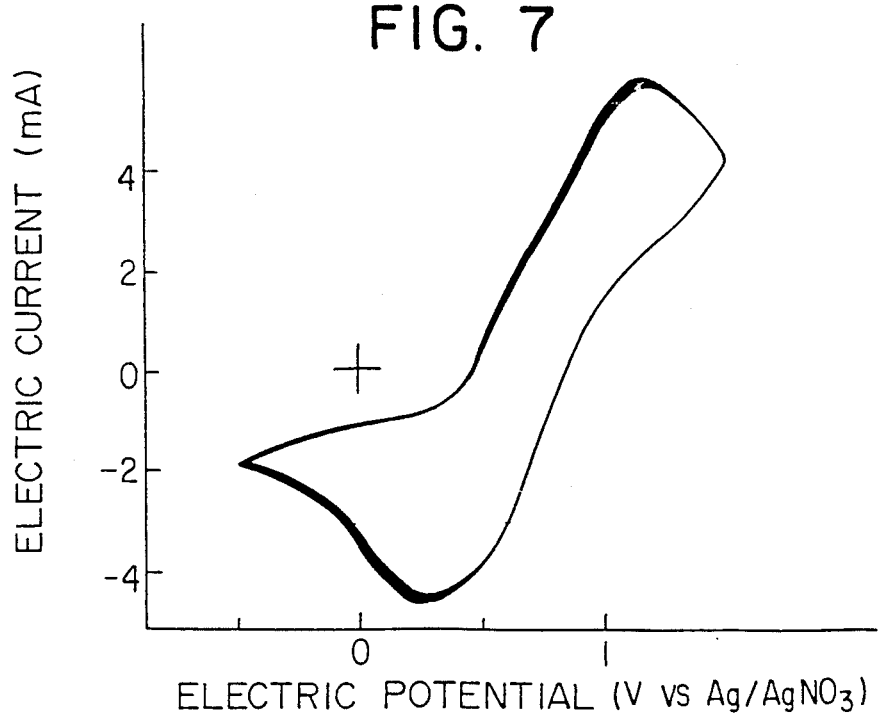
Figure 8:
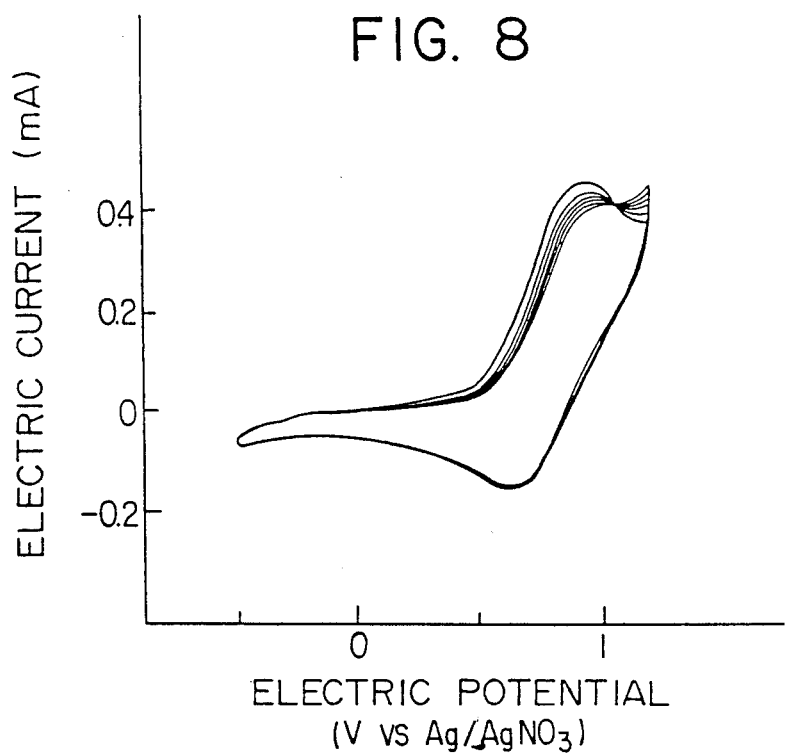
Figure 9:
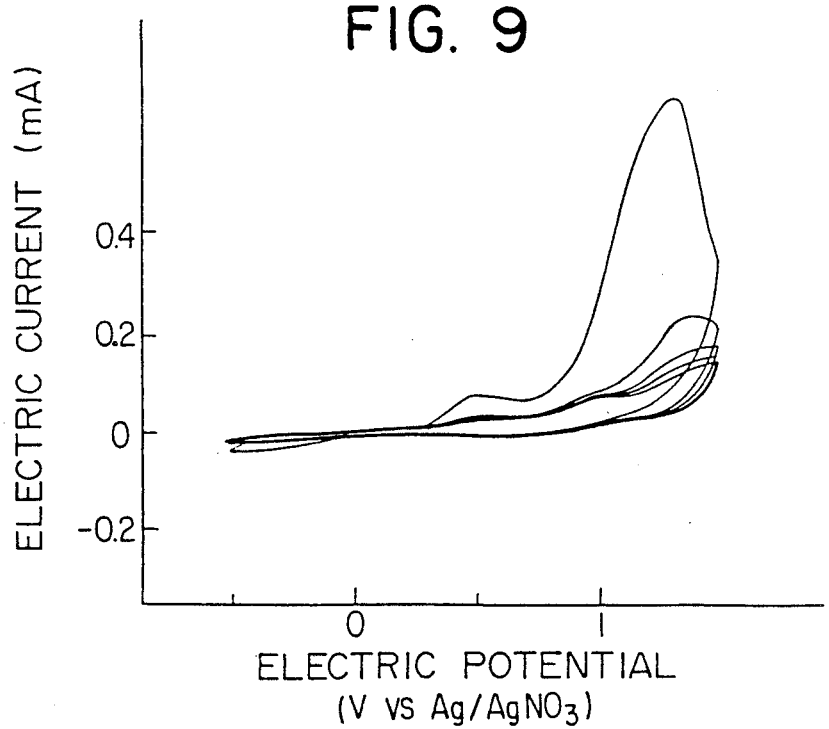
Figure 10:
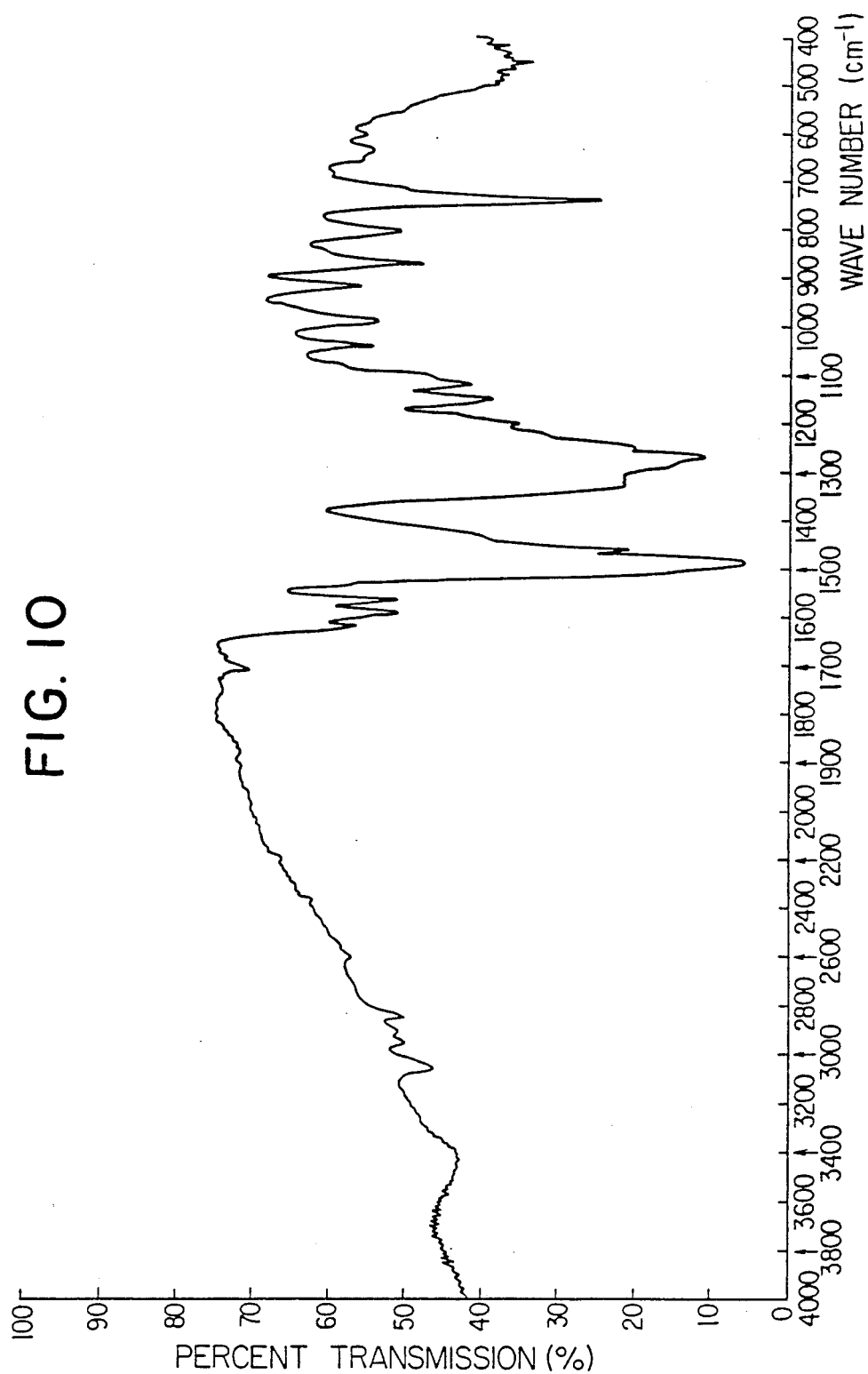
Figure 11:
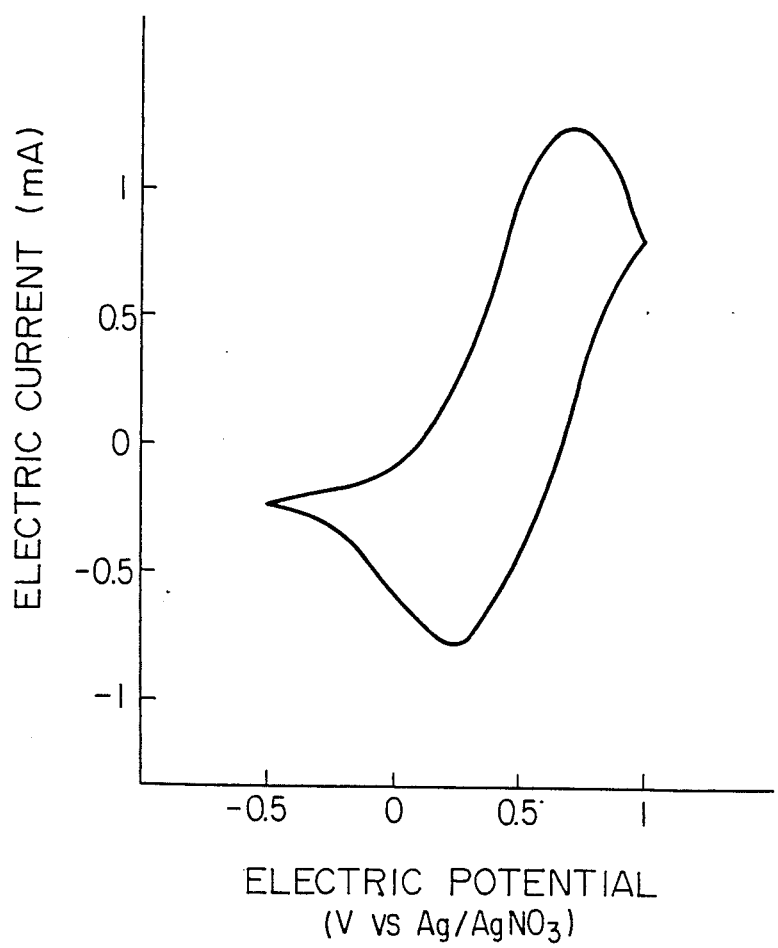
Figure 12:
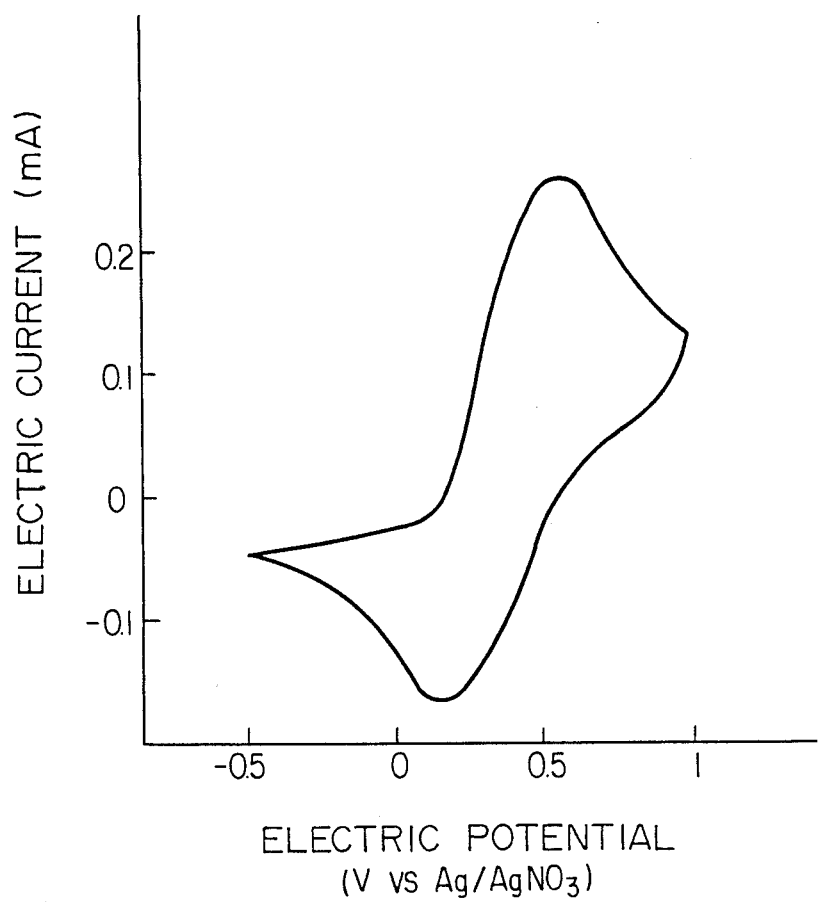

What is claimed is:

1. A copolymer represented by the general formula

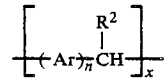

wherein Ar is

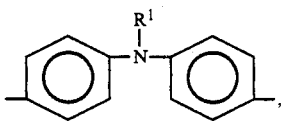

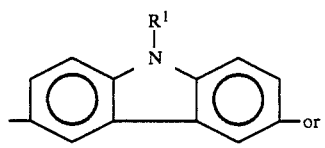

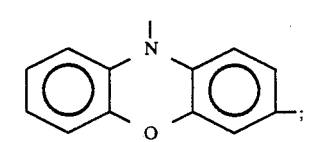

R$^1$ is hydrogen or a hydrocarbon group having 1 to 20 carbon atoms; R$^2$ is hydrogen, a hydrocarbon group having 1 to 20 carbon atoms, furyl, pyridyl, chlorophenyl, nitrophenyl or methoxyphenyl; n is an integer not less than 2 when Ar is (a) or (b), or n is an integer not less than 1 when Ar is (c); and x is an integer not less than 2.

2. A copolymer as set forth in claim 1, wherein n is an integer in the range of 1 to 50 and x is an integer in the range of 2 to 1,000.

3. An electroactive polymer obtained by doping the copolymer of claim 1 with an electron acceptor.

* * * * *

UNITED STATES PATENT AND TRADEMARK OFFICE
CERTIFICATE OF CORRECTION

PATENT NO. : 4,952,667
DATED : August 28, 1990
INVENTOR(S) : Yutaka Shikatani, et al.

It is certified that error appears in the above-identified patent and that said Letters Patent is hereby corrected as shown below:

On the Title page, Section [75]: "Hobuyuki Kuroda" should read as --Nobuyuki Kuroda--

Signed and Sealed this

Twenty-fifth Day of February, 1992

*Attest:*

HARRY F. MANBECK, JR.

*Attesting Officer*  *Commissioner of Patents and Trademarks*